United States Patent [19]

Toda et al.

[11] Patent Number: 5,237,013
[45] Date of Patent: Aug. 17, 1993

[54] COMPOSITION OF POLYBUTENE-1 AND A PROCESS FOR PREPARING SAME

[75] Inventors: Masatoshi Toda; Masahiko Kondo; Nobumasa Kita, all of Ichihara, Japan

[73] Assignee: Idemitsu Petrochemical Company Limited, Tokyo, Japan

[21] Appl. No.: 866,294

[22] Filed: Apr. 13, 1992

Related U.S. Application Data

[63] Continuation of Ser. No. 574,015, Aug. 29, 1990, abandoned.

[30] Foreign Application Priority Data

Aug. 30, 1989 [JP] Japan .................................. 1-224241

[51] Int. Cl.$^5$ .......................................... C08F 255/00
[52] U.S. Cl. ..................................... 525/247; 525/268; 525/270; 525/319; 525/320; 525/322; 525/324; 526/348.6
[58] Field of Search ............... 525/247, 270, 319, 320, 525/322, 324, 268; 526/348.6

[56] References Cited

U.S. PATENT DOCUMENTS 4,239,871 12/1980 Fukui ................................ 526/348.6
4,321,334 3/1982 Chatterjee ........................... 524/579
4,438,238 3/1984 Fukushima et al. ................ 525/240

FOREIGN PATENT DOCUMENTS 123607 9/1980 Japan .
2052532 1/1981 United Kingdom .

OTHER PUBLICATIONS

Chemical Abstracts, vol. 102, No. 12, Mar. 1985, Abstract No. 96461Z p. 25, col. L of JP-A-59-193-913.

Primary Examiner—Joseph L. Schofer
Assistant Examiner—R. H. Delmendo
Attorney, Agent, or Firm—Nikaido, Marmelstein, Murray & Oram

[57] ABSTRACT

Disclosed is a composition of polybutene-1 comprised of a polymer resulting from preliminarily polymerization of a small amount of an α-olefin, which has an intrinsic viscosity $[\eta]p$ of 7 dl/gram or lower, as measured at 135° C. in a decalin solution; and a homopolymer of butene-1 or a copolymer of butene-1 and 20% by weight of an α-olefin other than butene-1, the composition of polybutene-1 having an intrinisic viscosity $[\eta]t$ of 0.5–7.0 dl/gram, when measured at 135° C. in a decalin solution, and satisfying the following relationship with respect to the intrinsic viscosity $[\eta]p:[\eta]p \leq 2.5 \times [\eta]r$. The composition provides resulting films with highly improved appearance and with a lesser number of gel and fish eyes.

7 Claims, No Drawings

COMPOSITION OF POLYBUTENE-1 AND A PROCESS FOR PREPARING SAME

This application is a continuation of application Ser. No. 574,015 filed Aug. 29, 1990, now abandoned.

BACKGROUND OF THE INVENTION

1. Field of the Invention

The present invention relates to a composition of polybutene-1 and a process for preparing the same and, more particularly, to a composition and a process for the preparation of polybutene-1 which has less gel content and less fish eyes and which can preferably be used in the field of film.

2. Description of Related Art

A homopolymer of polybutene-1 or a copolymer of butene-1 with another olefin, as generally called polybutene-1, has been used for pipes for warm water due to its excellent creep resistance at high temperatures or in the film field due to its high orientation at a low degree of stretching. Such conventional polybutene-1, however, has the drawback that it is remarkably poor in moldability or forming performance because of its low speed of crystallization. Hence, various attempts have so far been made to solve the drawback of conventional polybutene-1.

In order to accelerate the cystallization speed, for example, U.S. Pat. No. 4,321,334 proposes using a nucleating agent in preparing polybutene-1. In this process, however, it is so difficult to disperse the nucleating agent in polybutene-1, that it cannot be said to produce the effect to a sufficient degree. Particularly, when polybutene-1 obtained by this process is formed to film, the film suffers from the disadvantage that fish eyes are caused to thereby give a poor appearance.

Further, Japanese Patent Unexamined Publication (kokai) No. 123,607/1980 discloses a process for preparing crystalline polybutene-1 having a high bulk density by subjecting a small amount of α-olefin other than butene-1 to preliminary polymerization in the process for preparing polybutene-1. As this process is developed with the object to provide polybutene-1 with high bulk density by using a small amount of the other α-olefin for preliminary polymerization, the above-identified patent publication is silent about the problems of gel content and fish eye. Turning now to specific examples of the description of the patent publication, it can be noted that they do not use a molecular weight modifier, such as hydrogen or the like, during preliminary polymerization. Hence, it can be presumed that a polymer obtainable by this preliminary polymerization may have a too high molecular weight, thereby causing gel and fish eye in large numbers.

SUMMARY OF THE INVENTION

The present invention has been performed under the above-mentioned circumstances and has the object to provide a composition of polybutene-1 having fewer gel and fish eyes and a process for preparing such a composition of polybutene-1.

In order to achieve the object, an aspect of the present invention is characterized by a composition comprising polybutene-1, which comprises a polymer obtainable by preliminarily polymerizing a small amount of an α-olefin, which will be contained in the final composition a proportion ranging from 0.005% to 5.0% by weight with respect to the resulting composition comprising polybutene-1 and having an intrinsic viscosity $[\eta]p$ of 7 dl/gram or less when measured at 135° C. in a decalin solution; and a polymer comprising units derived from butene-1 and an α-olefin, other than butene-1, in a proportion ranging from 0 to 20% by weight, and having an intrinsic viscosity $[\eta]t$ of 0.5-7.0 dl/gram when measured at 135° C. in a decalin solution. The intrinsic viscosity $[\eta]p$ of the polymer obtained by preliminary polymerization and the intrinsic viscosity of $[\eta]t$ of the polybutene-1 each satisfy the following relationship:

$$[\eta]p \leq 2.5 \times [\eta]t$$

In another aspect, the present invention comprises a process for preparing a composition comprising polybutene-1 having the properties as described hereinabove, which comprises a first step of subjecting an α-olefin to preliminary polymerization in the presence of a catalyst obtainable from a solid catalyst component containing magnesium, a halogen, titanium and an electron donating compound, and an organoaluminium compound, and in the presence of hydrogen, to thereby give a polymer having an intrinsic viscosity $[\eta]p$ of 7 dl/gram or less, when measured at 135° C. in a decalin solution; and a second step of polymerizing butene-1 or a mixture of butene-1 and an α-olefin other than butene-1, with the polymer resulting from the preliminary polymerization in the first step in the presence of a catalyst obtained by the above referred to preliminary polymerization, and a catalyst obtainable from an organoaluminium compound and an electron donor, to thereby produce a polybutene-1 composition containing the polymer resulting from the preliminary polymerization in a proportion of 0.005% to 5.0% by weight with respect to the total weight of the resulting polybutene-1 composition.

In a further aspect, the present invention comprises a process for preparing a composition comprising polybutene-1 having the properties as described hereinabove, which comprises a first step of subjecting an α-olefin to preliminary polymerization in the presence of (I) a catalyst obtainable from (A) a solid catalyst component containing magnesium, a halogen, titanium, and an electron donating compound, (B) an organoaluminium compound; and (C) an electron donor; and (II) hydrogen, to thereby give a polymer having an intrinsic viscosity $[\eta]p$ of 7 dl/gram or less, when measured at 135° C. in a decalin solution; and a second step of polymerizing butene-1, or a mixture of butene-1, and an α-olefin other than butene-1 with the polymer resulting from the above described preliminary polymerization, in the presence of a catalyst obtained from the preliminary polymerization, an organoaluminium compound and an electron donor, to thereby produce a composition comprising polybutene-1 which to contains the polymer resulting from the preliminary polymerization in a proportion of 0.005% to 5.0% by weight with respect to the total weight of the resulting polybutene-1 composition.

DESCRIPTION OF THE PREFERRED EMBODIMENTS

The composition of polybutene-1 according to the present invention comprises the polymer resulting from a preliminary polymerization and a homopolymer of butene-1 or a copolymer of butene-1 containing an α- olefin other than butene-1 in a proportion of 20% by weight or less.

Polymer Resulting from Preliminary Polymerization

A monomer unit constituting the polymer resulting from the preliminary polymerization may be an α-olefin having from 2 to 10 carbon atoms, preferably from 2 to 6 carbon atoms. The α-olefin may include, for example, ethylene, propylene, butene-1, hexene-1, 3-methyl-1-butene, 3,3-dimethyl-1-butene, 3-methyl-1-pentene, 4-methyl-1-pentene, 4,4-dimethyl-1-pentene, and so on. Preferred are ethylene, propylene, butene-1, 3-methyl-1-butene and 4-methyl-1-pentene. The monomer unit constituting the polymer resulting from the preliminary polymerization may be selected singly or in a mixture from the α-olefins as described hereinabove.

In accordance with the present invention, it is of significance that the molecular weight of the polymer resulting from the preliminary polymerization corresponds to an intrinsic viscosity $[\eta]p$ of 7 dl/gram or less, preferably from 0.5 to 6.0 dl/gram, when measured at 135° C. in a decalin solution.

If the intrinsic viscosity $[\eta]p$ of the polymer resulting from the preliminary polymerization is less than this upper limit, gel and fish eyes in the resulting polybutene-1 composition may increase to such an extent that the object of the present invention cannot be achieved. If its intrinsic viscosity $[\eta]p$ is below this preferred lower limit, the catalyst resulting from the preliminary polymerization may decrease in its flowability.

In accordance with the present invention, the polymer resulting from the preliminary polymerization may be contained in the resulting polybutene-1 composition in a proportion ranging generally from 0.005% to 5.0% by weight, preferably from 0.01% to 3.0% by weight. A too small proportion of the polymer resulting from the preliminary polymerization may worsen the morphology of the catalyst resulting from the preliminary polymerization and reduce its flowability, thereby decreasing polymerization activity; while a too high proportion of the polymer resulting from the preliminary polymerization may increase gel and fish eyes in the resulting polybutene-1 composition to such an extent that the object of the present invention cannot be achieved.

Homopolymer and Copolymer of Butene-1

The composition of polybutene-1 according to the present invention contains at least an homopolymer or an copolymer of butene-1. A copolymer of butene-1, as referred to in the present specification, is intended to mean a copolymer of butene-1 and an α-olefin, other than the butene-1. The α-olefin as referred to herein may be an α-olefin having from 2 to 10 carbon atoms, preferably from 2 to 6 carbon atoms, and may specifically include, for example, ethylene, propylene, n-pentene-1, 4-methylpentene-1, hexene-1, and so on. Preferred are ethylene, propylene and 4-methyl-pentene-1. These α-olefins may be used singly or in combination of two or more.

The α-olefin may be contained in the copolymer of butene-1 in a proportion of 20% by weight or less, preferably 15% by weight or less. If the content of the α-olefin becomes too great, the resulting polybutene-1 composition may present the drawback that its moldability into film is worsened.

The composition of polybutene-1 according to the present invention, which may contain a homopolymer or copolymer of butene-1, has an intrinsic viscosity $[\eta]t$ ranging from 0.5 to 7.0 dl/gram, preferably from 1.0 to 5.5 dl/gram, when measured at 135° C. in a decalin solution. If the intrinsic viscosity $[\eta]t$ of the resulting polybutene-1 composition becomes too small, on the one hand, mechanical properties of film resulting from the polybutene-1 composition may be decreased. If the intrinsic viscosity $[\eta]t$ of the resulting composition reaches too high a value, on the other hand, the moldability or forming performance of the resulting polybutene-1 composition may be worsened. In either case, the resulting composition cannot achieve the object of the present invention.

Furthermore, it is of more significance that the intrinsic viscosity $[\eta]t$ of the resulting polybutene-1 composition satisfies the following relationship with the intrinsic viscosity $[\eta]p$ of the polymer resulting from the preliminary polymerization:

$$[\eta]p \leq 2.5 \times [\eta]t.$$

If the above relationship is not satisfied, gel and fish eyes may be increased in the resulting composition of polybutene-1 so that the object of the present invention cannot be achieved. The composition of butene-1 according to the present invention, which satisfies the above relationship, can reduce gel and fish eyes to an extremely lesser extent.

Process for Preparing Composition of Polybutene-1

The composition of polybutene-1 according to the present invention may appropriately be prepared by the process according to the present invention.

The process for preparing the composition of polybutene-1 according to the present invention may involve preliminarily polymerizing an α-olefin in the presence of a catalyst comprising a solid catalyst component (A) obtainable from magnesium, halogen, titanium and an electron donating compound; an organoaluminium compound (B) and an electron donor (C) to be added, when needed, and hydrogen, and polymerizing the resulting polymer obtained by the preliminary polymerization with butene-1, or a mixture of the butene-1 and the α-olefin other than butene-1, in the presence of the catalyst resulting from the preliminary polymerization.

Catalyst

The catalyst to be used for the process according to a present invention may be prepared from the solid catalyst component (A) obtainable from magnesium, halogen, titanium and the electron donating compound an organoaluminum compound (B); and an electron donor (C), to be added when needed.

a) Solid Catalyst Component (A)

The solid catalyst component (A) constituting the catalyst to be used for the process according to the present invention may be prepared from a magnesium compound, the electron donating compound, and a halide of a tetravalent titanium.

The magnesium compound to be used may be any one which has heretofore been used as a raw material for preparing a highly active catalyst to be used for stereospecific polymerization of a lower α-olefin or for the preparation of an ethylene homopolymer or copolymer, such as linear polyethylene.

The magnesium compound may be represented by the following general formula:

$MgX_2$ wherein
X is identical to or different from each other and a halogen atom; an alkyl group having from 1 to 20 carbon atoms; a linear or branched aliphatic, alicyclic or aromatic alkoxy group, such as an alkoxy group, a cycloalkoxy group or an arylalkoxy group, having from 1 to 10 carbon atoms, which may have a substituent such as a hereto atom, i.e., a halogen atom, or substituted aryloxy group or a substituted alkylaryloxy group, which may have a substituent such as a hetero atom, i.e., a halogen atom.

The halogen atom of the magnesium compound as represented by symbol X in the above formula may include fluorine atom, chlorine atom, bromine atom and iodine atom. Chlorine atom is particularly preferred.

More specifically, the magnesium compounds as represented by the above general formula may include, for example:

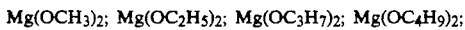

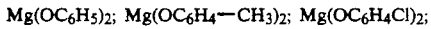

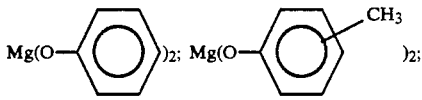

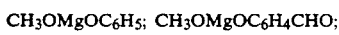

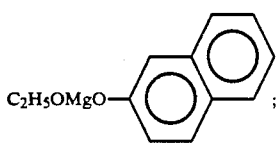

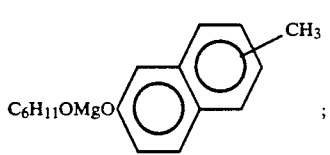

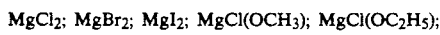

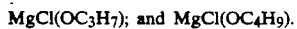

Among the magnesium compounds, a magnesium chloride compound and a lower alkoxy magnesium compound are preferred, and $MgCl_2$, $C_4H_9MgC_8H_{17}$, $Mg(OCH_3)_2$ and $Mg(OC_2H_5)_2$ are more preferred. Those magnesium compounds as described hereinabove may be used singly or in combination of two or more.

As the electron donating compound as an ingredient for the solid catalyst component (A), there may be used an organic compound containing oxygen, nitrogen, phosphorus or sulfur. Such electron donating compounds may include, for example, amines, amides, ketones, nitriles, phosphines, phosphoryl amides, esters, ethers, thioethers, thioesters, acid anhydrides, acid halides, acid amides, aldehydes, organic acids, and so on.

More particularly, the electron donating compounds may include, for example, an organic acid such as an aromatic carboxylic acid, e.g., benzoic acid or p-oxybenzoic acid; an acid anhydride such as an aliphatic acid anhydride, e.g., succinic anhydride, or an aromatic acid anhydride, e.g., benzoic anhydride or p-toluyl anhydride; a ketone having from 3 to 15 carbon atoms, such as an aliphatic ketone, e.g., acetone, methyl ethyl ketone or methyl isobutyl ketone, or an aromatic ketone, e.g., acetophenone, benzophenone or benzoquinone; an aldehyde having from 2 to 15 carbon atoms, such as an aliphatic aldehyde, e.g., acetoaldehyde, propionaldehyde or octylaldehyde, or an aromatic aldehyde, e.g., benzaldehyde, tolualdehyde or naphthaldehyde; a monoester, such as a monoester of an aliphatic carboxylic acid, e.g., methyl formate, methyl acetate, ethyl acetate, vinylacetate, propyl acetate, octyl acetate, cyclohexyl acetate, ethyl propionate, ethyl butyrate, ethyl valerate, acetate, ethyl propionate, ethyl butyrate, ethyl valerate, methyl chloroacetate, ethyl dichloroacetate, methyl methacrylate, ethyl crotonate, ethyl pivalate, dimethyl maleate or ethyl cyclohexanoate, or a monoester of an aromatic carboxylic acid, e.g., methyl benzoate, ethyl benzoate, propyl benzoate, butyl benzoate, octylbenzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate or ethylnaphthoate; an aromatic diester, e.g., dimethyl phthalate, diethyl phthalate, dipropyl phthalate, diisopropyl phthalate, diisobutyl phthalate, methyl ethyl phthalate, methyl propyl phthalate, methyl isobutyl phthalate, ethyl propyl phthalate, ethyl isobutyl phthalate, propyl isobutyl phthalate, dimethyl terephthalate, diethyl terephthalate, dipropyl terephthalate, diisopropyl terephthalate, diisobutyl terephthalate, methyl ethyl terephthalate, methyl propyl terephthalate, methyl isobutyl terephthalate, ethyl propyl terephthalate, ethyl isobutyl terephthalate, propyl isobutyl terephthalate, dimethyl isophthalate, diethyl isophthalate, dipropyl isophthalate, diisopropyl isophthalate, diisobutyl isophthalate, methyl ethyl isophthalate, methyl propyl isophthalate, methyl isobutyl isophthalate, ethyl propyl isophthalate, ethyl isobutyl isophthalate or propyl isobutyl isophthalate; an ester having from 2 to 18 capron atoms, e.g., γ-butyrolactone, δ-valerolactone, coumarin, phthalide or ethylene carbonate; an acid halide having from 2 to 15 carbon atoms, such as an aliphatic acid halide, e.g., acetyl chloride, or an aromatic acid halide, e.g., benzylchloride, toluyl chloride, anisic chloride; an etherhaving from 2 to 20 carbon atoms, e.g., methyl ether, furan, anisole, diphenyl ether or ethylene glycol butyl ether; ether; an acid amide, e.g., acetic amide, benzoic amide or toluic amide; an amine, e.g., tributyl amine, N,N'-dimethyl piperazine, tribenzylamine, aniline, pyridine, tribenzyl amine, picoline or tetramethyl ethyl ethylene diamine; and a nitrile, e.g., acetonitrile, benzonitrile or tolunitrile.

Among the electron donating compounds as described hereinabove, the esters, ethers, ketones and acid anhydrides are preferred. Particularly, an alkyl ester, such as an alkylester having from 1 to 4 carbon atoms, of the aromatic carboxylic acid, e.g., benzoic acid, p-methoxybenzoic acid, p-ethoxybenzoic acid or toluic acid, the aromatic diester such as diisobutyl phthalate or diisopropyl phthalate, the aromatic ketone such as benzoquinone, the aromatic carboxylic acid anhydride such as benzoic anhydride, and the ether such as ethylene glycol butyl ether are preferred. The electron donating compounds as described hereinabove may be used singly or in combination of two or more.

The halide of the tetravalent titanium as other raw material for the solid catalyst component (A) may include, for example, a titanium tetrahalide, such as $TiCl_4$, $TiBr_4$ or $TiI_4$; an alkoxytitanium trihalide, such as $Ti(OCH_3)Cl_3$; $Ti(OC_2H_5)Cl_3$; $n-C_4H_9OTiCl_3$ or $Ti(OC_2H_5)Br_3$; an alkoxytitanium dihalide, such as $Ti(OCH_3)_2Cl_2$; $Ti(OC_2H_5)_2Cl_2$; $(n-C_4H_9O)_2TiCl_2$ or $Ti(OC_3H_7)_2Cl_2$; or a trialkoxytitanium monohalide, such as $Ti(OCH_3)_3Cl$; $Ti(OC_2H_5)_3Cl$; $(n-C_4H_9O)_3TiCl$ or $Ti(OCH_3)_3Br$. Among the halides of the tetravalent titanium, the tetravalent titanium containing a larger number of halogen atoms is preferred and particularly titanium tetrachloride is more preferred. And the halides of the tetravalent titanium as described hereinabove may be used singly or in combination of two or more.

The procedure of preparing the solid catalyst component (A) may involve simultaneously or stepwise bringing the magnesium compound, the electron donating compound and the halide of the tetravalent titanium into contact with each other in a solvent of a hydrocarbon.

More specifically, the procedures of preparing the solid catalyst component (A) as disclosed in Japanese Patent Unexamined Publication Nos. 166,205/1981, 63,309/1982, 190,004/-1982, 300,407/1982, 47,003/1983 and 201,905/1987, for example, are preferred. Hence, those patent publications are incorporated by reference in this specification.

For instance, the solid catalyst components (A) may be prepared, for instance, by bringing a solid material with the magnesium compound deposited on an oxide of the element belonging to the group II to IV, inclusive, of the Periodic Table, such as silicon oxide, magnesium oxide or aluminium oxide, preferably silicon oxide, or on a oxide compound containing at least one member selected from the elements belonging to the group II to IV, inclusive, of the Periodic Table, such as silica-alumina or the like, into contact with the electron donating compound and the halide of the tetravalent titanium in a solvent at the temperature ranging from 0° C. to 200° C., preferably from 10° C. to 150° C., over the period of time ranging from 2 minutes to 24 hours, as disclosed in Japanese Patent Unexamined Publication (kokai) No. 201,905/1987.

The solid catalyst components (A) may also be prepared by first contacting the magnesium compound with the electron donating compound and then reacting the resulting magnesium compound with the halide of the tetravalent titanium at least twice, as disclosed in Japanese Patent Unexamined Publication (kokai) No. 63,309/1982.

In preparing the solid catalyst component (A), the solvent to be used may be any organic solvent as long as it is inert against the magnesium compound, the electron donating compound and the halide of the tetravalent titanium and it does not affect them adversely. Such an organic solvent may include, for example, an aliphatic hydrocarbon such as hexane or heptane, an aromatic hydrocarbon such as benzene or toluene, or a halogenated hydrocarbon, including a mono- or polyhalogen compound of a saturated or unsaturated, aliphatic, alicyclic or aromatic hydrocarbon.

The solid catalyst component (A) may be such that a mole ratio of the halogen to the titanium amounts to from 6:1 to 200:1, preferably from 7:1 to 100:1, a mole ratio of the magnesium to the titanium amounts to from 1:1 to 90:1, preferably from 5:1 to 70:1, and a mole ratio of the electron donating compound to the magnesium amounts to 0.01:1 or more, preferably from 0.03:1 to 1:1. If the mole ratio of the ingredient of the solid catalyst component (A) would be out the ranges as described hereinabove, the catalytic activity of the catalyst to be used and the stereospecificity of the resulting polymer may become insufficient.

Organoaluminium Compound (B)

The organoaluminium compound (B) to be used for the process according to the present invention is not restricted to a particular one and may be selected from ones as represented by the following general formulas:

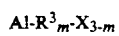

and

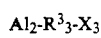

wherein
$R^3$ is an alkyl group having from 1 to 10 carbon atoms, or a cycloalkyl group or an aryl group, each having up to 10 carbon atoms;
m is an integer satisfying the relationship: $1 \leq m \leq 3$; and
X is a halogen atom such as chlorine or bromine.

Specifically, the organoaluminium compound (B) may include, for example, a trialkyl aluminium, such as trimethyl aluminium, triethyl aluminium, triisopropyl aluminium, triisobutyl aluminium or trioctyl aluminium, a dialkyl aluminium monohalide, such as diethyl aluminium monochloride, diisopropyl aluminium monochloride, diisobutyl aluminium monochloride or dioctyl aluminium monochloride, and an alkyl aluminium sesquihalide, such as ethyl aluminium sesquichloride. Among the organoaluminium compounds as described hereinabove, the trialkyl aluminium is preferred, and triisobutyl aluminium is more preferred.

Electron Donor (C)

The electron donor (C) may be used, as desired, when the use of the electron donor (C) does not adversely affect the properties of polybutene-1 resulting from polymerization yet it can expect improvements in morphology of the catalyst to be used during preliminary polymerization, thereby bettering sedimentation and flowability of the catalyst in a slurry and, as a result, leading to the readiness of transferring the catalyst for the preliminary polymerization to a reactor in which polymerization takes place in order to produce polybutene-1.

The electron donor (C) to be used for the process according to the present invention may be any donor of a cyclic structure or of an open ring structure, as long as it contains one or more hetero atoms. Particularly, a heterocyclic compound may appropriately be used, which may be represented by the following general formula:

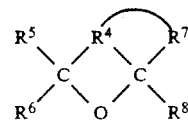

wherein

R[4] and R[7] each are a carbohydryl group, preferably a carbohydryl group having from 2 to 5 carbon atoms; and R[5], R[6] and R[8] each are a hydrogen atom or a carbohydryl group having from 1 to 5 carbon atoms.

The heterocyclic compounds as represented by the above general formula may preferably include, for example, a cineol, e.g., 1,4-cineol, 1,8-cineol or m-cineol.

It is further noted that a heterocyclic compound other than the heterocyclic compounds as represented by the above general formula may also be used, which may include, for example, a silicon compound including an arylalkoxy silane, such as triethoxyphenyl silane, diphenyl dimethoxyphenyl silane, or the like.

Preliminary Polymerization

The preliminary polymerization may be carried out by polymerizing the α-olefin in the presence of the catalyst obtainable from the solid catalyst component (A), the organoaluminium compound (B) and the electron donor (C) to be optionally added, and hydrogen. This preliminary polymerization may be conducted in an inert solvent or under gas phase conditions.

The inert solvent to be used for the preliminary polymerization may be an aliphatic hydrocarbon having from 3 to 12 carbon atoms and may specifically include, for example, propane, butane, pentane, 2-methylbutane, hexane, 2-methylpentane, 2,2-dimethylbutane, heptane, octane, 2,2,3-trimethylpentane, nonane, 2,2,5-trimethylhexane, decane, dodecane, and so on.

For the catalyst to be used for the preliminary polymerization, the solid catalyst component (A), the organoaluminium compound (B) and the electron donor (C) may be used so as for a mole ratio of the aluminium of the organoaluminium compound (B) to the titanium of the solid catalyst component (A) to amount to 0.1:1 to 200:1, preferably 0.5:1 to 50:1 and for a mole ratio of the electron donor (C) to the aluminium of the organoaluminium compound (B) to amount to up to 10:1, preferably from 0.02:1 to 2:1.

In carrying out the preliminary polymerization, hydrogen is used to adjust the intrinsic viscosity [η]p of the resulting polymer as a parameter for determining the molecular weight of the polymer. However, it is noted that a too large amount of hydrogen adversely affects the formation of the polymer, leading to a failure to increase the molecular weight of a polymer to a sufficient extent, while a too small amount of hydrogen may cause an increase in the molecular weight of the resulting polymer to a too large extent. Hence, it is preferred to maintain the amount of hydrogen to be used for the preliminary polymerization within the range of from 0.01 to 10 kg/cm$^2$, preferably from 0.02 to 2 kg/cm$^2$, as a partial pressure of hydrogen in a gas phase section of a reactor or a vessel in which the preliminary polymerization takes place, in order to adjust the intrinsic viscosity [η]p of the polymer resulting from the preliminary polymerization within the predetermined range. The extent of preliminary polymerization may be adjusted by changing the amount of the α-olefin.

It may further be noted that the intrinsic viscosity of the polymer resulting from the preliminary polymerization may be adjusted by the polymerization temperature or the polymerization period, in addition to a sufficient amount of hydrogen.

In other words, the shorter the polymerization period, the smaller the molecular weight of the polymer resulting from the preliminary polymerization. Therefore, the time period for the preliminary polymerization may normally range 5 hours or less, preferably from 10 second to 3 hours, in order to provide the composition of polybutene-1 which can be formed into a film with less gel and fish eyes.

Further, it can be noted that a lower temperature for the preliminary polymerization may cause an increase in the molecular weight of the resulting polymer. The preliminary polymerization temperature may range from 0° C. to 100° C., preferably from 20° C. to 70° C., in order to provide the composition of polybutene-1 leading to a film with less gel and fish eyes.

The preliminary polymerization may be carried out by means of slurry polymerization or gas phase polymerization.

The preliminary polymerization may be suspended or interrupted by deleting non reacted α-olefin from reaction system by washing or degassing. The reaction mixture obtained by suspending the preliminary polymerization contains the catalyst used for the preliminary polymerization and the polymer resulting therefrom as well. As the preliminary polymerization is based on coordination anion polymerization, it is presumed that growth of the resulting polymer is partly suspended in the reaction mixture with the double bond of the polymer coordinated on an active site of the catalyst. As the active site on the catalyst is still present in an active state even if the preliminary polymerization is suspended in an appropriate fashion, the reaction mixture can be used as it is or in a slurry obtainable by removing a major portion of the solvent from the reaction mixture, for polymerization (hereinafter referred to sometimes as "primary polymerization") which follows the preliminary polymerization. Further, a solid component containing the catalyst and the polymer resulting from the preliminary polymerization, which can be obtained by removing the solvent from the reaction mixture, may also be used for primary polymerization. This solid component containing an active site of catalyst may be washed and dried, as needed. When it is dried, the solid component containing an active site of catalyst may be stored for a long period of time.

In accordance with the present invention, a so-called primary polymerization is carried out subsequent to the preliminary polymerization.

Primary Polymerization

The primary polymerization may involve polymerizing butene-1 or a mixture of butene-1 and an α-olefin other than the butene-1 with the polymer obtained by the preliminary polymerization in the presence of the catalyst obtained by suspension of the preliminary polymerization. More specifically, the reaction mixture, the slurry or the solid component, each resulting from the preliminary polymerization, is then subjected to the primary polymerization which follows after the preliminary polymerization, with the polymer resulting from the preliminary polymerization in the presence of the catalyst obtained from the preliminary polymerization. In other words, a reaction system in which the primary polymerization takes place may be formed by first adding an additional amount of the organoaluminium and electron donor to the reaction mixture, the slurry or the solid component resulting from the preliminary polymerization and then adding butene-1 or a mixture of butene-1 and the α-olefin other than butene-1 to the resulting mixture or by adding butene-1 or a mixture of butene-1 and the α-olefin other than butene-1 to the reaction mixture, the slurry or the solid component obtained by the preliminary polymerization in the manner as described hereinabove. In this case, butene-1 or the mixture of butene-1 and the α-olefin other than the butene-1 is polymerized with the polymer obtained by the preliminary polymerization in the presence of the catalyst used for the preliminary polymerization, remaining organo aluminum compound which is not used for composing preliminary polymerization catalyst, and electron donor. For the primary polymerization, the amounts of the catalyst resulting from the preliminary polymerization and the organoaluminum compound and the electron donor to be added further during the primary polymerization may be used in such an adjusted fashion that the molar ratio of the aluminium in the organoaluminium compound to the titanium in the catalyst obtained by the preliminary poymerization may range usually from 0.1:1 to 500:1, preferably from 0.5:1 to 200:1, and the mole ratio of the electron donor to the aluminum of the organoaluminum compound may range generally from 0.001:1 to 10:1, preferably from 0.02:1 to 2:1.

The primary polymerization is carried out subsequent to the preliminary polymerization, after removal of the unreacted α-olefin from the reaction mixture or without removing it therefrom, for example, by means of slurry polymerization, gas phase polymerization, solution polymerization using butene-1 as a medium, or the like, thereby polymerizing butene-1 or the mixture of butene-1 and the α-olefin other than butene-1 with each other with the polymer obtained by the preliminary polymerization and producing a homopolymer or a random copolymer of butene-1.

In producing the random copolymer of butene-1, the butene-1 and the other α-olefin are fed, together with hydrogen, to a reactor in which polymerization takes place, in such an amount that the content of the other α-olefin in the resulting copolymer may account for 20% by weight or less with respect to the weight of the resulting composition of polybutene-1. Further, in carrying out the primary polymerization with the unreacted α-olefin left unremoved from the reaction mixture obtained by the preliminary polymerization, the amount of the α-olefin other than butene-1 to be charged for the primary polymerization may be determined with the fact taken into account that the unreacted α-olefin is also polymerized with butene-1 during the primary polymerization.

The intrinsic viscosity of the composition of polybutene-1 may be adjusted in accordance with the ratio of the monomer or monomers to hydrogen.

The degree of polymerization to be achieved by the primary polymerization may be adjusted in such a fashion that the rate of the polymer resulting from the preliminary polymerization at which it is contained in the polybutene-1 composition to be formed as polymerization proceeds may range from 0.005% to 5.0% by weight with respect to the weight of the resulting polybutene-1.

Processing After Polymerization

In accordance with the process according to the present invention, the processing after the polymerization may be implemented in conventional manner. When butene-1 is polymerized or copolymerized by means of gas phase polymerization, the resulting polymer may be discharged in a form of powder from a reactor or vessel in which polymerization takes place. The resulting polymer in the powdery form may pass through a nitrogen stream or the like in order to remove the unreacted olefin and so on therefrom or it may be pelletized through an extruder, when desired. In this case, a small amount of water or an alcohol may be added to the resulting polymer in order to thoroughly inactivate the catalyst contained in the resulting polymer. When the monomer or monomers such as butene-1 and/or the other α-olefin is or are polymerized by means of slurry polymerization or solution polymerization, the resulting polymer may be discharged from the reactor or vessel and then pelletized subsequent to thorough removal of the monomers, solvents and other components from the resulting reaction mixture.

To the composition of polybutene-1 according to the present invention may be added, when needed, a variety of additives, such as an antioxidant, an agent for sorbing sodium chloride, an aggregate preventive, a heat-resistant stabilizer, a ultraviolet absorbing agent, a lubricant, an anti-weathering stabilizer, an antistatic preventive, a nucleating agent, a pigment and a filler.

The composition of polybutene-1 according to the present invention may be molded or formed into a variety of molded or formed products, such as films, pipes and so on.

In summary, the present invention can provide the composition of polybutene-1 which can reduce occurrence of gel and fish eyes resulting from the occurrence of gel by about 80% or more and which can be utilized particularly for molding materials for films and so on due to improved appearance. The present invention can provide the process for the preparation of the composition of polybutene-1 having the improved characteristics as described hereinabove.

The present invention will be described more in detail by way of examples with reference to comparative examples.

EXAMPLE 1 a) Preparation of Solid Catalyst Component (A)

A 10-liter four-necked flask was dried well and charged with 5 liters of dehydrated n-heptane, 500 grams (4.4 moles) of magnesium diethoxide and 153 grams (0.55 mole) of di-n-butyl phthalate, and the mixture was reacted under reflux over the period of 1 hour. The resulting reaction mixture was cooled down to 90° C., and 2.5 kg (132 moles) of titanium tetrachloride was dropwise added over the period of 50 minutes to the reaction mixture and the mixture was further reacted at 90° C. for 2 hours. Thereafter, the reaction mixture was cooled down to 30° C. and allowed to stand and the resulting supernatant liquid was removed, followed by addition of 7 liters of n-heptane. The mixture was stirred and then allowed to stand leaving a supernatant which in turn was removed. This operation was repeated twice and then the residue was washed. To the resulting residue was added 5 liters of n-heptane, and the mixture was heated to 70° C. and 2.5 kg (132 moles) of titanium tetrachloride was dropwise added, followed by reaction at 90° C. for 2 hours. The reaction mixture was further heated to 80° C., and the resulting supernatant was removed, followed by the addition of another 7 liters of n-heptane and washing. The washing was repeated until no chlorine ion could be detected any more, thereby yielding the solid catalyst component (A).

b) Preliminary Polymerization

A 20-liter vessel for preliminary polymerization with a stirrer, which had previously been replenished with nitrogen gas (N$_2$), was charged with 14 liters of n-hexane, dried with Molecular Sieves, and 333 mmol of triisobutyl aluminium (TIBA). To this mixture was added 67 mmol of the solid catalyst component (A) (as translated into mole of the titanium atom) obtained in a) above, and hydrogen was added at a pressure of 0.3 kg/cm$^2$ followed by the gradual addition of 1,340 grams of 4-methylpentene-1 as a monomer for preliminary polymerization.

The mixture was then reacted at 30° C. over the period of 15 minutes while it was slowly stirred, and the preliminary polymerization was suspended. The reaction system was in a suspended state immediately after the suspension of the reaction and the solid ingredients were allowed to settle down and precipitate on a bottom portion of the reaction vessel as the time passed. After the supernatant was removed from the reaction vessel, the precipitated solid residue was washed three times with 15 liters of dry hexane. The resulting solid ingredient was used for primary polymerization which followed.

On the other hand, part of the resulting polymer was isolated by washing part of the above solid ingredient with methanol.

The intrinsic viscosity [$\eta$]p of the resulting polymer was 2.90 dl per gram when measured at 135° C. in a decalin solution.

c) Primary Polymerization

A 7-liter autoclave with a stirrer, which was being replenished with a nitrogen stream, was charged with the catalyst obtained in b) above in the amount of 0.1 mmol, as translated into mole of the titanium atom, 2 mmol of TIBA and 0.3 mmol of triethoxyphenyl silane (TEPS), and then nitrogen, hydrogen and butene-1 were fed so as to amount to the nitrogen partial pressure of 3.0 kg/cm$^2$, the hydrogen partial pressure of 0.1 kg/cm$^2$ and the butene-1 partial pressure of 4.0 kg/cm$^2$, respectively. Thereafter, an additional amount of butene-1 was continuously fed so as to reach a constant entire pressure, and the mixture was then subjected to gas phase polymerization at 55° C. for 3 hours.

After completion of the polymerization, the unreacted monomers were removed from the reaction mixture, yielding the polybutene-1 composition in a form of powder in the amount of 1,650 grams.

The polybutene-1 composition was then granulated by an extruder and formed into film as a sample.

The composition of polybutene-1 was evaluated for intrinsic viscosity [$\eta$]t and occurrence of fish eyes in the following way:

Intrinsic viscosity [$\eta$]t: measured at 135° C. in a decalin solution

Fish eyes evaluation (measured on film, thick in 30 micron): expressed in number per 1,000 cm$^2$;

A numerator in the representation of 0.2 mm<10-.1-0.2 mm means a number of fish eyes having diameter of 0.2 mm or more than 0.2 mm and a denominator means a number of fish eyes having diameter of 0.1-0.2 mm.

A device used for measuring fish eyes was an automatic detector of laser beams type (Takenaka System Kiki K.K.).

The results of measurement for the composition of polybutene-1 are shown in Table below.

COMPARATIVE EXAMPLE 1

The procedure was followed in the same manner as in Example 1, except for the preliminary polymerization having been carried out without use of hydrogen, and the polymer resulting from the preliminary polymerization had an intrinsic viscosity [$\eta$]p of 8.3 dl/gram. This procedure gave a composition of polybutene-1 in the form of powder in the amount of 1,700 grams, which had an intrinsic viscosity [$\eta$]t of 2.5 dl/gram.

The results of measurement for the resulting composition are shown in Table below.

EXAMPLE 2

The procedure was followed in the same manner as in Example 1, except for using a mixture of butene-1 with ethylene, in place of the use of butene-1 for the primary polymerization, yielding the composition of polybutene-1 in the form of powder in the amount of 1,760 grams, which had an intrinsic viscosity [$\eta$]t of 2.7 dl/gram.

The results of measurement for the resulting composition are shown in Table below.

COMPARATIVE EXAMPLE 2

The procedure was followed in the same manner as in Comparative Example 1, except for using a mixture of butene-1 with ethylene, in place of the use of butene-1 for the primary polymerization, yielding the composition of polybutene-1 in the form of powder in the amount of 1,590 grams, which had an intrinsic viscosity [$\eta$]t of 2.8 dl/gram.

The results of measurement for the resulting composition are shown in Table below.

EXAMPLE 3

The procedure was followed in the same manner as in Example 1, except for using 4-methylpentene-1 for preliminary polymerization, in place of the use of ethylene, yielding the composition of polybutene-1 in the form of a powder in the amount of 1,530 grams, which had an intrinsic viscosity [$\eta$]t of 2.3 dl/gram.

The results of measurement for the resulting composition are shown in Table below.

COMPARATIVE EXAMPLE 3

The procedure was followed in the same manner as in Example 1, except for the preliminary polymerization having been carried out without the use of hydrogen and with the use of ethylene in place of 4-methypentene-1, yielding the the composition of polybutene-1 in the form of powder in the amount of 1,580 grams, which had an intrinsic viscosity [$\eta$]t of 2.3 dl/gram.

The results of measurement for the resulting composition are shown in Table below.

EXAMPLE 4

The procedure was followed in the same manner as in Example 1, except for using butene-1 in place of 4-methylpentene-1 for preliminary polymerization and changing the preliminary polymerization temperature to 10° C., yielding the composition of polybutene-1 in the form of powder in the amount of 1,650 grams, which had an intrinsic viscosity $[\eta]t$ of 2.9 dl/gram.

The results of measurement for the resulting composition are shown in Table below.

COMPARATIVE EXAMPLE 4

The procedure was followed in the same manner as in Comparative Example 1, except for using butene-1 in place of the use of 4-methylpentene-1 for the preliminary polymerization and changing the preliminary polymerization temperature to 10° C., yielding the composition of polybutene-1 in the form of powder in the amount of 1,530 grams, which had an intrinsic viscosity $[\eta]t$ of 2.9 dl/gram.

The results of measurement for the resulting composition are shown in Table below.

EXAMPLE 5

The procedure was followed in the same manner as in Example 1, except for using propylene in place of the use of 4-methylpentene-1 for the preliminary polymerization, yielding the composition of polybutene-1 in the form of powder in the amount of 1,560 grams, which had an intrinsic viscosity $[\eta]t$ of 2.5 dl/gram.

The results of measurement for the resulting composition are shown in Table below.

COMPARATIVE EXAMPLE 5

The procedure was followed in the same manner as in Comparative Example 1, except for using propylene in place of the use of 4-methylpentene-1 for the preliminary polymerization, yielding the composition of polybutene-1 in the form of powder in the amount of 1,600 grams, which had an intrinsic viscosity $[\eta]t$ of 2.8 dl/gram.

The results of measurement for the resulting composition are shown in Table below.

EXAMPLE 6

A 7-liter autoclave with a stirrer was charged with 500 ml of dry n-hexane, 0.5 mmol of TIBA, 0.4 mmol of 1,8-cineol and 0.1 mmol-Ti of the solid catalyst component prepared above, as measured by the mole of the titanium atom, while nitrogen stream was passed therethrough, and hydrogen was then added to the resulting mixture at the rate of 0.3 kg/cm$^2$. After the addition of 3.0 grams of hexene-1, the mixture was reacted for 30 minutes and the autoclave was then replenished with nitrogen. To the resulting mixture were added 2 mmol of TIBA and 0.3 mmol of TEPS, and 2,500 grams of butene-1 was added and the resulting mixture was subjected to solution polymerization at the hydrogen partial pressure of 0.5 kg/cm$_2$ at 70° C. for 30 minutes, yielding the composition of polybutene-1 in the amount of 650 grams, which had the intrinsic viscosity $[\eta]t$ of 2.2 dl/gram.

The results of measurement for the resulting composition are shown in Table below.

COMPARATIVE EXAMPLE 6

The procedure was followed in the same manner as in Example 6, except for using no hydrogen for the preliminary polymerization, yielding the composition of polybutene-1 in the amount of 620 grams, which had the intrinsic viscosity $[\eta]t$ of 2.3 dl/gram.

The results of measurement for the resulting composition are shown in Table below.

EXAMPLE 7

The procedure was followed in the same manner as in Example 1, except for using hydrogen at the rate of 1.0 kg/cm$^2$ for the preliminary polymerization and the hydrogen partial pressure having been changed to 0.13 kg/cm$^2$ during the primary polymerization, yielding the composition of polybutene-1 in the form of powder in the amount of 1,530 grams, which had an intrinsic viscosity $[\eta]t$ of 1.9 dl/gram.

The results of measurement for the resulting composition are shown in Table below.

EXAMPLE 8

The procedure was followed in the same manner as in Example 1, except for using 4-methylpentene-1 in the amount of 2,680 grams and hydrogen at a pressure of 0.05 kg/cm$^2$ for the preliminary polymerization and the hydrogen partial pressure having been changed to 0.003 kg/cm$^2$ during the primary polymerization, yielding the composition of polybutene-1 in the form of powder in the amount of 1,560 grams, which had an intrinsic viscosity $[\eta]t$ of 6.0 dl/gram.

The results of measurement for the resulting composition are shown in Table below.

EXAMPLE 9

The procedure was followed in the same manner as in Example 1, except for the amount of TIBA having been changed to 16.7 mmol and the amount of the solid catalyst component (A) having been changed to 3.4 mmol, as determined in the mole of the titanium atom, upon the preliminary polymerization, yielding the composition of polybutene-1 in the form of powder in the amount of 1,680 grams, which had an intrinsic viscosity $[\eta]t$ of 2.6 dl/gram.

The results of measurement for the resulting composition are shown in Table below.

COMPARATIVE EXAMPLE 7

The procedure was followed in the same manner as in Example 1, except for the amount of TIBA having been changed to 8.3 mmol and the amount of the solid catalyst component (A) having been changed to 1.7 mmol, as determined from the moles of titanium atoms, upon the preliminary polymerization, yielding the composition of polybutene-1 in the form of powder in the amount of 1,480 grams, which had an intrinsic viscosity $[\eta]t$ of 2.5 dl/gram.

The results of measurement for the resulting composition are shown in Table below.

EXAMPLE 10

A 7-liter autoclave with a stirrer was charged with 2,000 kg of butene-1 while it was replenished with nitrogen stream, and solution polymerization was carried out in the presence of the polymer and catalyst resulted from the preliminary polymerization in the same manner as in Example 1, TIBA and TEPS at the hydrogen partial pressure of 0.5 kg/cm$^2$ and the temperature of 70° C. for 30 minutes. After the unreacted monomer was removed, the resulting polymer was finely divided into powders. The resulting composition of polybutene-1 in the powdery form was yielded in the amount of 600 grams and it had an intrinsic viscosity $[\eta]t$ of 2.4 dl/gram.

17

The composition was also evaluated in the same manner as in Example 1 and the results of evaluation are shown in Table below.

COMPARATIVE EXAMPLE 8

The procedure was followed in the same manner as in Example 10, except for the hydrogen partial pressure having been changed to 0.002 kg/cm$^2$, yielding the composition of polybutene-1 having an intrinsic viscosity $[\eta]t$ of 7.1 dl/gram. This composition was so poor in moldability that it could not form a film in a sufficient fashion.

The resulting composition was evaluated in the same manner as in Example 1 and the results of evaluation for the resulting composition are shown in Table below.

COMPARATIVE EXAMPLE 9

The procedure was followed in the same manner as in Example 1, except for the content of the polymer resulting from the preliminary polymerization in the composition of polybutene-1 having been changed to 0.002% by weight, yielding the composition of polybutene-1 in the form of powder in the amount of 980 grams. It was found as a result that the use of the polymer resulting from the preliminary polymerization in the amount of 0.002% by weight or less decreased the activity of the catalyst.

The results of evaluation for the resulting composition are shown in Table below.

EXAMPLE 11

The procedure was followed in the same manner as in Example 5, except for butene-1 and propylene having been fed simultaneously into the reactor in the course of the primary polymerization, yielding the composition of polybutene-1 in the form of powder in the amount of 1480 grams, which had an intrinsic viscosity $[\eta]t$ of 2.8 dl/gram.

EXAMPLE 12

The procedure was followed in the same manner as in Example 1, except for the addition of the electron donor (1,8-cineol) in the amount of 133 mmol in the course of the preliminary polymerization. The catalyst resulting from preliminary polymerization was found to have good morphology, and good sedimentation of the catalyst in the slurry was visually recognized. The composition of polybutene-1 in the form of powder was yielded in the amount of 1,650 grams, which had an intrinsic viscosity $[\eta]t$ of 2.5 dl/gram.

EXAMPLE 13

The procedure was followed in the same manner as in Example 2, except for the addition of the electron donor (1,8-cineol) in the amount of 133 mmol in the course of the preliminary polymerization. The catalyst resulting from preliminary polymerization was found to have good morphology. The composition of polybutene-1 in the form of powder was yielded in the amount of 1,750 grams, which had an intrinsic viscosity $[\eta]t$ of 2.6 dl/gram.

EVALUATION

As will be apparent from the results as shown in Table below, it has been found that, when the intrinsic viscosity $[\eta]p$ of the polymer resulting from preliminary polymerization satisfies the following relationship with the intrinsic viscosity $[\eta]t$ of the composition of polybutene-1: $[\eta]p \leq 2.5 \times [\eta]t$, the number of fish eyes has been reduced by 80% or more.

It is further found that the amount of the polymer resulting from preliminary polymerization should be in the range from 0.005% to 5.0% by weight. The evaluation results indicates that the use of the preliminary polymer in an amount less than 0.005% by weight may reduce the catalyst activity as shown in Comparative Example 9 and that the use of the polymer in an amount more than 5.0% by weight may increase the number of fish eyes even if the relationship of the intrinsic viscosity $[\eta]p$ of the polymer resulting from preliminary polymerization with the intrinsic viscosity $[\eta]t$ of the polybutene-1 composition would satisfy the above condition, as shown in Comparative

EXAMPLE 7

It is further to be noted that the intrinsic viscosity of the polymer resulting from the preliminary polymerization should be 7 dl/gram or less, when measured at 135° C. in a decalin solution. As shown in Comparative Example 3, it is found that the number of fish eyes begins increasing when the intrinsic viscosity $[\eta]p$ of the polymer resulting from the preliminary polymerization is 6.3 dl/gram and the number of gels specs and fish eyes have increased at intrinsic viscosity values $[\eta]p$ higher than 7 dl/gram.

When the intrinsic viscosity $[\eta]p$ is 0.4 dl/gram, as measured at 135° C. in a decalin solution, as shown in Example 7, the number of fish eyes in the composition of polybutene-1 can be reduced to a sufficient extent yet flowability of the polymer resulting from the preliminary polymerization may decrease. Hence, it is preferred that the intrinsic viscosity $[\eta]p$ of the polymer resulting from preliminary polymerization be in the range from 0.5 to 6.00 dl/gram when measured at 135° C. in a decalin solution.

TABLE I

| Examples No. | NUMBER FOR PRELIMINARY POLY- MERIZATION | DEGREE OF PRELIMINARY PORY- MERIZATION (wt %) | AMOUNT OF α-OLEFIN (wt %)** | $[\eta]_P$ (dl/g) | $[\eta]_T$ (dl/g) | $[\eta]_p \leq$ $2.5 \times [\eta]_r$ | ACTIVITY (kg-POLY- MER/$_g$-Ti) | NUMBER OF FISH EYES (/1000 cm$^2$) (0.2 mm $\leq$/ 0.1~0.2 mm) |
|---|---|---|---|---|---|---|---|---|
| EX. 1 | 4-METHYL-PENTENE-1 | 0.12 | — | 2.9 | 2.5 | YES | 343 | 4/10 |
| CO. EX. 1 | 4-METHYL-PENTENE-1 | 0.12 | — | 8.3 | 2.5 | NO | 350 | 90/150 |
| EX. 2 | 4-METHYL-PENTENE-1 | 0.11 | 1.5 | 3.2 | 2.7 | YES | 370 | 7/13 |
| CO. EX. 2 | 4-METHYL-PENTENE-1 | 0.13 | 1.5 | 8.3 | 2.8 | NO | 330 | 55/202 |
| EX. 3 | ETHYLENE | 0.12 | — | 2.5 | 2.3 | YES | 320 | 8/20 |
| CO. EX. 3 | ETHYLENE | 0.11 | — | 6.3 | 2.3 | NO | 330 | 30/123 |

TABLE I-continued

| Examples No. | NUMBER FOR PRELIMINARY POLY- MERIZATION | DEGREE OF PRELIMINARY PORY- MERIZATION (wt %) | AMOUNT OF α-OLEFIN (wt %)** | $[\eta]_P$ (dl/g) | $[\eta]_T$ (dl/g) | $[\eta]_p \leq 2.5 \times [\eta]_r$ | ACTIVITY (kg-POLY-MER/$_g$-Ti) | NUMBER OF FISH EYES (/1000 cm$^2$) (0.2 mm $\leq$/ 0.1~0.2 mm) |
|---|---|---|---|---|---|---|---|---|
| EX. 4 | BUTENE-1 | 0.11 | — | 2.6 | 2.9 | YES | 345 | 3/14 |
| CO. EX. 4 | BUTENE-1 | 0.13 | — | 7.8 | 2.9 | NO | 320 | 43/128 |
| EX. 5 | PROPYLENE | 0.12 | — | 3.0 | 2.5 | YES | 325 | 4/13 |
| CO. EX. 5 | PROPYLENE | 0.12 | — | 7.5 | 2.8 | NO | 335 | 51/175 |
| EX. 6 | HEXENE-1 | 0.45 | — | 2.0 | 2.2 | YES | 135 (0.5 hr POLY-MERIZATION) | 7/11 |
| CO. EX. 6 | HEXENE-1 | 0.46 | — | 6.1 | 2.3 | NO | 130 (0.5 hr POLY-MERIZATION) | 43/149 |
| EX. 7 | 4-METHYL-PENTENE-1 | 0.1 | — | 0.6 | 1.9 | YES | 320 | 7/15 |
| CO. EX. 7 | 4-METHYL-PENTENE-1 | 5.2 | — | 3.0 | 2.5 | YES | 310 | 21/115 |
| EX. 8 | 4-METHYL-PENTENE-1 | 0.25 | — | 5.5 | 6.0 | YES | 325 | 7/14 |
| CO. EX. 8 | 4-METHYL-PENTENE-1 | 0.33 | — | 2.9 | 7.1 | YES | 120 | NOT MOLDED INTO FILM |
| EX. 9 | 4-METHYL-PENTENE-1 | 2.3 | — | 3.1 | 2.6 | YES | 350 | 9/45 |
| CO. EX. 9 | 4-METHYL-PENTENE-1 | 0.002 | — | 1.5 | 2.5 | YES | 200 | 3/7 |
| EX. 10 | 4-METHYL-PENTENE-1 | 0.32 | — | 2.9 | 2.4 | YES | 125 (0.5 hr POLY-MERIZATION) | 6/14 |
| EX. 11 | PROPYLENE | 0.13 | 13 | 3.0 | 2.8 | YES | 310 | 7/30 |
| EX. 12 | 4-METHYL-PENTENE-1 | 0.12 | — | 2.8 | 2.5 | YES | 340 | 3/9 |
| EX. 13 | 4-METHYL-PENTENE-1 | 0.11 | 1.5 | 3.1 | 2.6 | YES | 365 | 5/11 |

Note:
**AMOUNT OF α-OLEFIN OTHER THAN BUTENE-1.

What is claimed is:

1. A composition comprising: (I) a polymer resulting from preliminary polymerization of an α-olefin; and (II) a homopolymer of butene-1 monomer or a copolymer of butene-1 monomer and 20% by weight or less of an α-olefin monomer other than butene-1 resulting from the polymerization of said monomer or said monomers in the presence of the polymer product of said preliminary polymerization;
   wherein said polymer (I) is contained in said composition in a proportion of 0.005% to 5.0% by weight with respect to the weight of the composition; and has an intrinsic viscosity $[\eta]_p$ of 7 dl/gram or lower, as measured at 135° C. in a decalin solution;
   wherein said composition has an intrinsic viscosity $[\eta]_r$ 0.5 to 7.0 dl/gram, when measured at 135° C. in a decalin solution; and
wherein the intrinsic viscosity $[\eta]_r$ of said composition satisfies the following relationship with respect to the intrinsic viscosity $[\eta]_p$ of the polymer (I) resulting from said preliminary polymerization:

$$[\eta]_p \leq 2.5 \times [\eta]_r.$$

2. In a butene-1 polymer composition comprising (I) a polymer resulting from the preliminary polymerization of an α-olefin; and (II) a homopolymer of butene-1 monomer, or a copolymer of butene-1 monomer and an α-olefin monomer other than butene-1, wherein said polymer II is made in the presence of said polymer I, the improvement which comprises:
   the amount of said polymer (I) being 0.005% to 5.0% by weight of said composition; and the intrinsic viscosity $[\eta]_p$ of said polymer (I) being 7 dl/gram or less, as measured at 135° C. in a decalin solution; where the copolymer of butene-1 and an α-olefin other than butene-1 is prepared from butene-1 monomer and 20% by weight or less of at least one monomer selected from the group consisting of ethylene, propylene, 4-methyl-1-pentene, and 3-methyl-1-butene; and
said composition having an intrinsic viscosity $[\eta]_r$ satisfying the following relationship with respect to the intrinsic viscosity $[\eta]_p$ of the polymer (I):

$$[\eta]_p \leq 2.5 \times [\eta]_r.$$

3. A composition of a butene-1 polymer comprising (I) a polymer resulting from preliminary polymerization of an α-olefin; and (II) a homopolymer of butene-1, or a copolymer of butene-1 and an α-olefin other than butene-1, which is prepared by:
   a first step of subjecting said α-olefin monomer of polymer (I) to preliminary polymerization in the presence of hydrogen and a catalyst comprising a solid catalyst component containing magnesium, a halogen, titanium and an electron donating compound; and an organoaluminum compound; which polymer resulting from said preliminary polymerization has an intrinsic viscosity $[\eta]_p$ of 7 dl/gram or less, as measured at 135° C. in a decalin solution; and
   a second step of polymerizing butene-1, or a mixture of butene-1 and the α-olefin other than butene-1, in the presence of said polymer (I), said catalyst used in said preliminary polymerization, and a catalyst comprising an organoaluminum compound and an electron donor;
   which composition of butene-1 polymer contains said polymer (I) resulting from said preliminary polymerization in a proportion of 0.005% to 5.0% by weight with respect to the weight of said composition.

4. A composition as claimed in claim 1, wherein the intrinsic viscosity [η]t of the polymer resulting from preliminary polymerization ranges from 0.5 to 6.0 dl/gram as measured at 135° C. in a decalin solution.

5. A composition as claimed in claim 1, wherein the polymer resulting from preliminary polymerization is contained in the composition in a proportion ranging from 0.01% to 3.0% by weight.

6. A composition as claimed in claim 1, wherein the polymer resulting from preliminary polymerization is of at least one monomer selected from the group consisting of ethylene, propylene, butene-1, 4-methyl-1-pentene and 3-methyl-1-butene.

7. A composition as claimed in claim 1, wherein the α-olefin other than butene-1, to be used as a monomer unit in the copolymer of butene-1, is ethylene, propylene or 4-methyl-1-pentene.

* * * * *